P. SCHRAG & P. HUFELAND.

Machine for Cutting off Lead Pencils.

No. 5,236. Reissued Jan. 14, 1873.

Witnesses:
Ernst Bilhuber
C. Walters.

Inventors.
Eberhard Faber
per Geo. Ph. Hufeland
Wm. Cartwright & Sons
Attys

AM. PHOTO-LITHOGRAPHIC CO. N.Y. (OSBORNE'S PROCESS.)

UNITED STATES PATENT OFFICE.

PHILIP SCHRAG AND PHILIP HUFELAND, OF NEW YORK, N. Y., ASSIGNORS TO EBERHARD FABER.

IMPROVEMENT IN MACHINES FOR CUTTING OFF LEAD-PENCILS.

Specification forming part of Letters Patent No. 103,241, dated May 17, 1870; reissue No. 5,236, dated January 14, 1873.

*To all whom it may concern:*

Be it known that PHILIP SCHRAG and PHILIP HUFELAND, of the city, county, and State of New York, have invented a new and useful Improvement in Machines for Cutting Off Lead-Pencils; and the following is hereby declared to be a full, clear, and exact description thereof, which will enable those skilled in the art to make and use the same, reference being had to the accompanying drawing forming part of this specification, in which drawing—

Figure 1:
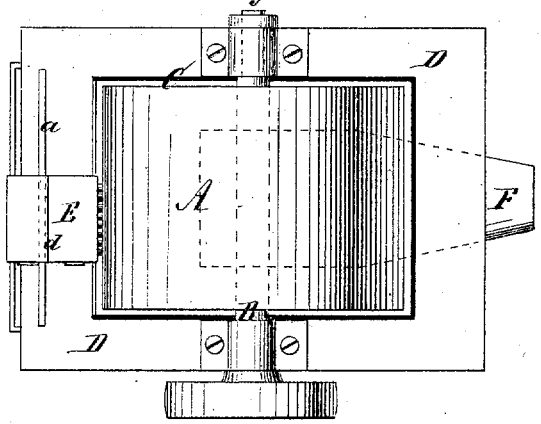
Figure 2:
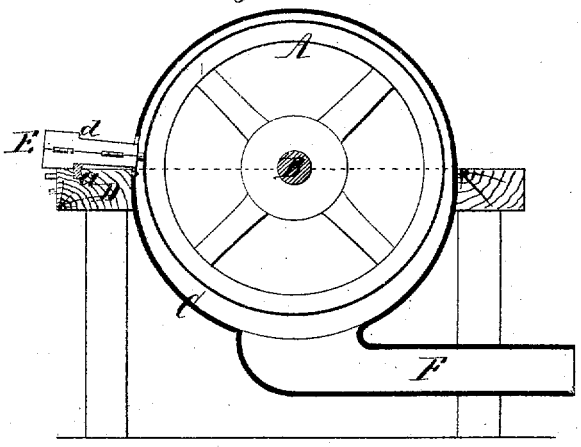
Figure 3:
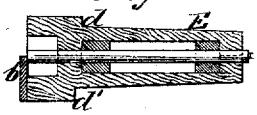
Figure 4:
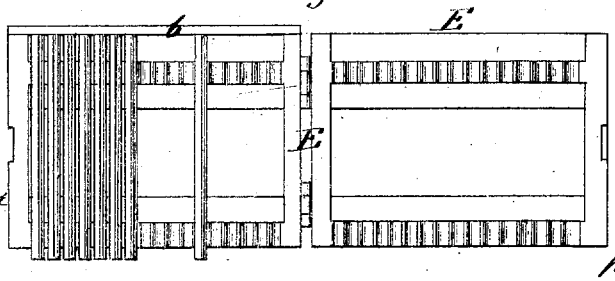

Figure 1 represents a plan or top view of this invention, the top of the inclosing-jacket having been removed to expose the working parts. Fig. 2 is a transverse vertical section of the same. Fig. 3 is a detached section of the pencil-retaining clamp on a larger scale than the previous figures. Fig. 4 is a plan or top view of the same when opened and partly filled with pencils.

Similar letters indicate corresponding parts.

This invention consists in the combination of a moving grinding-surface with a pencil-retaining clamp, and with a clamp-supporting rail, in such a manner that by securing a number of pencils in the clamp and holding their ends up against the moving grinding-surface said ends are cut off without danger of breaking the lead or of splitting the wood, and the tedious and difficult labor of cutting said pencils with a saw can be dispensed with. The pencil-retaining clamp is provided with two shoulders, situated on opposite sides, and one slightly in advance of the other, in such a manner that, by the combined action of the pencil-retaining clamp, the clamp-supporting rail, and the moving grinding-surface, the pencils can be readily cut to a uniform length. The drum or moving grinding-surface is inclosed in a tight box, which connects with an exhaust-fan in such a manner that the dust created by the operation is drawn off and prevented from annoying the person or persons at work on the cutting-machine or in the same room where said machine is put in operation.

In the drawing, the letter A designates a drum made of wood or any other suitable material, and covered with sand-paper or other material of a similar nature capable of producing a cutting or grinding surface. Said drum is mounted on a shaft, B, which has its bearings in the sides of a frame, D, supporting a jacket or box, C, which completely incloses the drum with the exception of a narrow space, through which the pencils to be cut are introduced and pressed up against the cutting-surface of the drum. On the frame D, and opposite the open space in the box C, is fastened a rail, *a*, which forms the support and guide for a clamp, E, in which the pencils to be cut are secured. This clamp is made in two halves, which are connected by a hinge, and each of which is provided with a series of semicircular cavities to receive the pencils, (see Fig. 4,) so that when the clamp is opened a number of pencils can be placed in the cavities of one-half, and by closing the clamp said pencils are firmly retained. When secured in the clamp the pencils bear with their rear ends against an abutment, *b*, as shown in Figs. 3 and 4 of the drawing, while their front ends project beyond the clamp, so that they can be brought to bear against the cutting or grinding surface of the drum. The clamp E is provided with two shoulders, *d d′*, one of which is slightly in advance of the other, and in cutting off the first ends of the pencils the shoulder *d*, which is nearest to the inner edge of the clamp, is turned down, and the clamp being situated on the rail *a* is pressed up against the drum until said shoulder *d* strikes the rail. The pencils are then reversed in the clamp and the clamp is turned over so as to bring the second should *d′* down, and the second ends of the pencils are cut off as before.

This operation of turning over the clamp is necessary, because, if the pencils were simply reversed in the clamp, the shoulder *d* would not allow said clamp to advance near enough toward the cutting-surface of the drum to cut off the second ends of the pencils; but by turning over the clamp, and by placing the shoulder *d′* somewhat back of the shoulder *d*, the second ends of the pencils can be cut off, and all the pencils when cut will be of uniform length.

From the bottom part of the case C extends a tube, F, which connects with an exhaust-fan, so that the dust created by the grinding-operation is carried off, and is prevented from annoying the persons in the room or place where the cutting-machine is at work.

By these means the operation of cutting off lead-pencils is materially simplified. No saws or files are required, the wood of the pencils is not liable to split, and the grinding-surface of the drum can be readily renewed at comparatively small expense, and the pencils are brought in such a condition that a small shaving taken off from their ends after the pencils have been varnished imparts to said ends the required finish.

If desired, the cutting material may be applied to the side of the drum, or an endless belt might be used to produce a similar effect to the drum shown in the drawing.

What is claimed as new, and desired to be secured by Letters Patent, is—

1. The combination of a moving grinding-surface, A, with a clamp, E, made to retain a series of pencils, and with a clamp-supporting rail, substantially in the manner and for the purpose specified.

2. A pencil-retaining clamp, provided with shoulders *d d'*, one of said shoulders being in advance of the other, in combination with a guide-rail and a moving grinding-surface, substantially as set forth.

3. The jacket or box C, inclosing the cutting-drum A, in combination with a pencil-retaining clamp, and with a tube, F, for connecting with an exhaust-fan, substantially as and for the purpose described.

EBERHARD FABER.

Witnesses:
W. HAUFF,
E. G. KASTENHUBER.